United States Patent [19]

Kühn

[11] Patent Number: 4,985,667

[45] Date of Patent: Jan. 15, 1991

[54] DEVICE FOR PIVOTING A MOTOR-VEHICLE MIRROR FROM THE NORMAL POSITION TO A NON-DAZZLE POSITION

[75] Inventor: Willi Kühn, Bleckede, Fed. Rep. of Germany

[73] Assignee: Frank Brinckmann, Hamburg, Fed. Rep. of Germany

[21] Appl. No.: 346,992

[22] PCT Filed: Aug. 11, 1988

[86] PCT No.: PCT/EP88/00720

§ 371 Date: Mar. 31, 1989

§ 102(e) Date: Mar. 31, 1989

[87] PCT Pub. No.: WO89/01428

PCT Pub. Date: Feb. 23, 1989

[30] Foreign Application Priority Data

Aug. 13, 1987 [DE] Fed. Rep. of Germany ....... 3727033

[51] Int. Cl.[5] ............ G05B 19/10

[52] U.S. Cl. ............ 318/567; 350/281; 350/279; 350/278

[58] Field of Search ............ 318/567; 350/281, 279, 350/278

[56] References Cited

U.S. PATENT DOCUMENTS 4,443,057 4/1984 Bauer et al. ............ 350/281
4,580,875 4/1986 Bechtel et al. ............ 350/278
4,838,650 6/1989 Stewart et al. ............ 350/280

FOREIGN PATENT DOCUMENTS 3437775 4/1986 Fed. Rep. of Germany .

*Primary Examiner*—William M. Shoop, Jr.
*Assistant Examiner*—Saul M. Bergmann
*Attorney, Agent, or Firm*—Lane, Aitken & McCann

[57] ABSTRACT

Device for pivoting a motor-vehicle mirror in or at a car from the normal position (fully-reflecting condition V) to a non-dazzle position (partly-reflecting condition T) in the event of excessive glare (B) from the headlight of a following vehicle and taking into account any interference from ambient light (U), said device comprising a voltage-source, a motor (M), the shaft (10) of which acts upon the mirror through a tilting mechanism and which is fed from thyristors (T1 and T2) which are, in turn, controlled by transistors (TR1, TR2 and TR3) with the aid of photodiodes or photoresistors (B, U) for glare and interference from ambient light. A bipolar rotary switch (DS) is connected in series with the motor (M), said switch interrupting the flow of current through the motor in accordance with a specific angle of rotation of the shaft thereof, disconnecting the previously conducting thyristor (T1 or T2) from the voltage-source and switching it off. The tilting mechanism comprises: a crank-disc (11) driven by the motor with a crank-pin (12) and a connecting rod (13) which is moved back and forth by means of said crank-pin, which connecting rod is connected to the mirror and is designed with a substantially elliptical opening (14) surrounding said crank-pin, the areas (15) thereof of greater radial extension being associated with the switching area of the rotary switch (DS), while the areas (16) of lesser radial extension are associated with the normal and non-dazzle positions (V, T) of the mirror (FIG. 1).

6 Claims, 2 Drawing Sheets

DEVICE FOR PIVOTING A MOTOR-VEHICLE MIRROR FROM THE NORMAL POSITION TO A NON-DAZZLE POSITION

The invention relates to a device for pivoting a motor-vehicle mirror from the normal position (fully-reflecting condition V) to a non-dazzle position (partly-reflecting condition T) in the event of excessive glare (B) from the headlight of a following vehicle and taking into account any interference from ambient light (U), said device comprising a voltage-source, a motor (M), the shaft (10) of which acts upon the mirror through a tilting mechanism and which is fed from thyristors (T1 and T2) which are, in turn, controlled by transistors (TR1, TR2 and TR3) with the aid of photodiodes or photoresistors (B and U) for glare and interference from ambient light.

Automatically adjustable rear-view mirrors for motor-vehicles are known (German OS No. 34 37 775). In the known rear-view mirror a mirror accommodated in a housing is pivoted from a normal position with high reflection to a non-dazzle position with reduced reflection by means of an electric motor. Its drive shaft is connected to the mirror by a transmission. The transmission is in the form of a worm drive through which the drive shaft drives a shaft bearing a cam for driving a switch. It is connected to at least one eccentric part which is guided displaceably in the housing in a guide running in lateral direction to the axis of the shaft. In order to take ambient light into account, an electrical bridge-circuit is provided which feeds the motor through a comparison of the (electrical) glare- and ambient-light-signals and an amplifier. Neither the electric circuit, nor the drive mechanism meets the existing requirements of pivoting devices for motor-vehicle mirrors, since the electronic circuit responds merely to the ratio between glare and ambient light and because many mechanical parts must be accelerated and braked in order to adjust the mirror and it is not even possible to bring the mirror exactly to its terminal position, a fact attributable to, among other things, the run-on properties of the motor and the transmission, but also to the elongated hole by means of which rotary motion is converted into tilting motion. In addition to this, the electronic circuit is extremely complex and costly.

It is an object of the invention to design a device of the type mentioned at the beginning hereof in such a manner that the electronic circuit thereof responds to the absolute magnitude of incident light (glare, ambient light), while the mechanism consists of only a few and relatively small mechanical parts for pivoting the mirror.

One particular advantage of the invention is that it provides, with few electronic components, a circuit which responds to absolute magnitudes and controls the motor in such a manner that it comes to a stop at stable terminal positions and even motor and transmission run-on cannot cause the mirror to shift ("flutter"). This is aided by the transfer mechanism of the device according to the invention, whereby the rotary motions of the motor are converted into pivoting or tilting motions. The device according to the invention responds to a specific amount of glare and shifts the mirror from the normal position (V) to the non-dazzle position (T) unless a specific amount of ambient light is also present. This allows suitable amounts of light to be established for the response, without the mutual ratio of these magnitudes being of importance as in the known bridge-circuits.

An example of embodiment of the invention is explained hereinafter in conjunction with the drawings attached hereto, wherein FIG. 1 a circuit for the device according to the invention;

FIG. 2 parts of the tilting mechanism for the device according to the invention;

Figure 1:
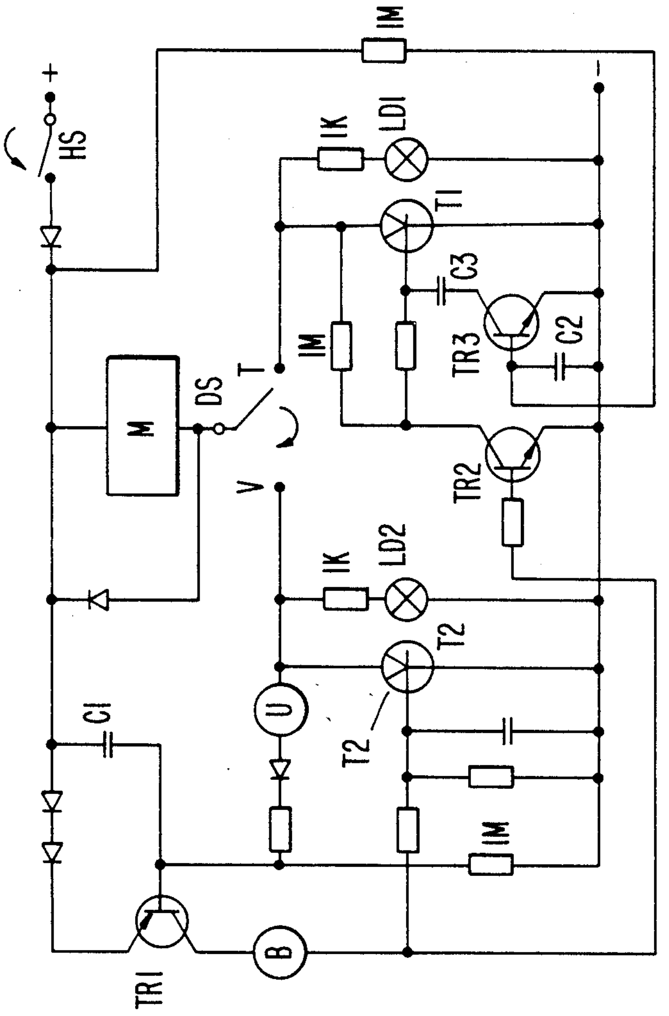
FIG. 1 shows an example of embodiment of a circuit according to the invention.

The circuit is connected to the positive and negative poles of a source of direct voltage, for example the 12V direct voltage of a motor-vehicle. The circuit can be switched-on or switched-off by means of a main switch HS, so that the device according to the invention can be switched-off when automatic adjustment of the mirror is not required by the driver. A diode following main switch HS protects the circuit from interchanging the connections.

M indicates a direct-voltage motor which acts, through a transmission, upon the mirror-adjusting mechanism. It is possible to use drive-means other than a rotating motor. It is important to arrange, at the output end, in this case the output shaft, a rotary switch DS having two positions T and V. Suitable for this purpose is a bipolar switch, i.e. a switch which, when it is switched over, establishes no electrical connection between contact-pieces T and V. Since rotary switch DS and the pivoting mechanism are both arranged upon the motor shaft, the T-position of the switch corresonds to the position of the mirror in which light falling thereon is only partly reflected. This is, therefore, the so-called non-dazzle position of the rear-view mirror. The position of the switch marked V corresponds to the normal position of the mirror, i.e. incident light is fully reflected.

It will be seen that the circuit provides two current-paths for motor M, for the purpose of shifting the motor from one position to the other. A thyristor T1 is associated with position T and a thyristor T2 with position V. Thus if a current flows from the voltage source through the motor and switch DS in position T and through thyristor T1, motor M will be set in rotation, it carries along the movable-element of rotary switch DS and thus interrupts the flow of current through motor M. In a similar manner, thyristor T2 ensures that the motor is rotated in such a manner that rotary switch DS moves from position V to position T.

Thyristor T1 is triggered by a transistor TR2 which is connected, through a resistor (1MΩ), to the anode thereof and, through another resistor, to the gate thereof. Furthermore, a transistor TR3 is also connected, through a capacitor C3, to the gate of thyristor T1. The base of transistor TR3 is applied, through a capacitor C2, to the negative terminal of the source of voltage.

The gate of thyristor T2 can be triggered by a transistor TR1. The base of transistor TR1 is connected, through a capacitor C1, to the positive terminal of the source of voltage. Also provided are two diodes wired in series and connected, in parallel with capacitor C1, to the emitter of transistor TR1. Transistor TR1 is a pnp-transistor whereas transistors TR2 and TR3 are npn-transistors. The capacity of capacitors C1 and C2 is about 10 μF, that of capacitor C3 35 μF.

Light-emitting diodes LD1 and LD2 indicate the conductivity conditions of thyristors T1 and T2.

Located in the circuit are two elements marked U and B. These may be diodes which are rendered conductive by incident light. They may also be so-called photoresistors, the resistance of which is reduced to a low value by incident light.

The element marked B is that element which responds to glare, for example, when a vehicle approaches too closely from the rear and/or the headlights are on "bright".

The element marked U responds to ambient light. This is light which strikes the car from the side, for example when a street-light is passed or a lighter is lit. The term also applies to daylight.

Upon examining the circuit, it will be realized that it is a logic-evaluation circuit which shifts motor M and thus also rotary switch DS to position T only when light falls upon diode B and no light falls upon diode U, i.e. when the driver is dazzled, at night time, by a following vehicle. Under all other conditions of light falling upon diodes U and B, the circuit is to shift rotary switch DS into position V or to leave it there, i.e. the mirror is in its normal position so that the incident light is fully reflected.

A number of operating conditions will be explained hereinafter in conjuction with the circuit.

In the condition shown in FIG. 1, switch DS is in position T in which the mirror reflects incident light only partly.

In this condition, thyristor T2 is conductive while thyristor T1 is non-conductive so that only the light-emitting diode LD1 lights up. In the conductive condition of thyristor T2, the gate thereof is at a high positive potential, so that, through the corresponding connection, the base of transistor TR2 is also at a high potential, i.e. transistor TR2 is conductive. With transistor TR2 conductive, the gate of thyristor T1 is at negative potential, i.e. cannot ignite.

Now if no light falls upon photodiode B, i.e. if the driver is not being dazzled by a following vehicle, photodiode B closes, and the base of transistor TR2 drops to a low potential so that transistor TR2 becomes non-conductive. This, however, allows the gate of thyristor T1 to pass to a high potential through the resistors shown, and thyristor T1 ignites. Diode LD1 goes out and motor M is supplied with current from the voltage-source. Rotary switch DS is thus shifted from the position shown to the position V, i.e. the current flowing from motor M is switched off. With rotary switch DS in position V, the mirror is in its normal position.

If, with the mirror in its normal position, ambient light falls upon photodiode U, this becomes conductive, allowing the base of transistor TR1 to pass to a high potential. In this condition, however, pnp-transistor TR1 cannot conduct. As a result of this, the gate of thyristor T2 is at a low potential and thyristor T2 cannot ignite.

Now if light falls upon photodiode B, this becomes conductive. But transistor TR1 cannot conduct so that, again, thyristor T2 cannot ignite and the motor finally receives no current. The mirror thus remains in its normal position V. One particular advantage of the circuit of the device according to the invention resides in the way in which the previously conductive thyristor is switched off. This is attributable to the fact that the thyristors T1 and T2 are located in a circuit which is interrupted by rotary switch DS. This means that the previously conductive transistor is disconnected from the voltage-source by interruption of the connection between its anode and the voltage-source by switch DS.

When the switch DS is in position V and light falls upon the photodiode B and not upon the photodiode U, as will occur at nighttime when a driver is dazzled by headlights from a following vehicle, the diode B will become conductive and the diode U will remain non-conductive. This action raises the potential at the grid of the thyrister T2 causing it to fire and causing current to flow through the thyrister, the switch DS and the motor M. As a result, the movable element of the switch DS will be driven from the position V to the position T thus, driving the mirror to the non-dazzle position.

Consideration will now be given to the special case where the vehicle is stopped and the circuit is switched off with the mirror in position T. If thereafter the vehicle is started in daylight, care must be taken to ensure that the mirror moves to position V immediately after the vehicle has been started.

As soon as the circuit is switched on, switch DS is in position T. Photodiode U is conductive since it receives ambient light, but there is no connection to the positive terminal of the voltage-source because switch DS is in position T. Photodiode B is also conductive because it receives daylight. Correspondingly, the gate of thyristor T1 is high and it cannot ignite.

When switch HS is switched on, capacitor C1 is charged through the resistor (1MΩ). This brings the base of transistor TR1 to a high potential so that it opens. This allows the lower connection of photodiode B to drop to a low potential so that transistor TR2 opens and the gate of thyristor T1 acquires a positive potential. This allows thyristor T1 to ignite, to feed the motor and to shift rotary switch DS to position V.

In this position, thyristor T2 cannot ignite because photodiode U receives light and has therefore become conductive, even though switch DS is in position V. The reason for this is that the base of transistor TR1 is at a high potential so that the transistor TR1 is open. This means that the gate of thyristor T2 is at a high potential and thyristor T2 therefore cannot ignite, the motor cannot run, and switch DS remains in position V.

Based upon the position shown in FIG. 1, in which the mirror is subjected to glare, consideration is given to the case where this glare ceases. The mirror is not intended to return to the normal position abruptly, this should rather take place with a delay in the order of 1 second which the circuit achieves as follows. (In order to set this period of time, an element such as a potentiometer may be provided to allow individual adjustment to shorter or longer times). In order to allow thyristor T1 to ignite, capacitor C3 must be charged. Through conductive transistor TR3 capacitor C3 is charged with current. After capacitor C3 has been charged and the gate of thyristor T1 achieves ignition-voltage, the latter becomes conductive and brings the motor, and thus switch DS, to position V.

Simultaneously with the charging of capacitor C2, capacitor C1 is charged when switch HS is switched on. As soon as the voltage in C2 is high enough, transistor TR3 becomes conductive and the return-delay becomes effective by the charging of capacitor C3. If transistor TR3 is not conductive, capacitor C3 cannot be charged.

The invention also ensures that the mirror is tilted only as a result of long-term interference. If photodiode B is subjected to strong light for a short time only, then, although thyristor T2 becomes conductive, transistor TR2 has not yet switched over because the gate of thyristor T2 is connected, through an additional resistor, to the base of transistor TR2.

Figure 2:
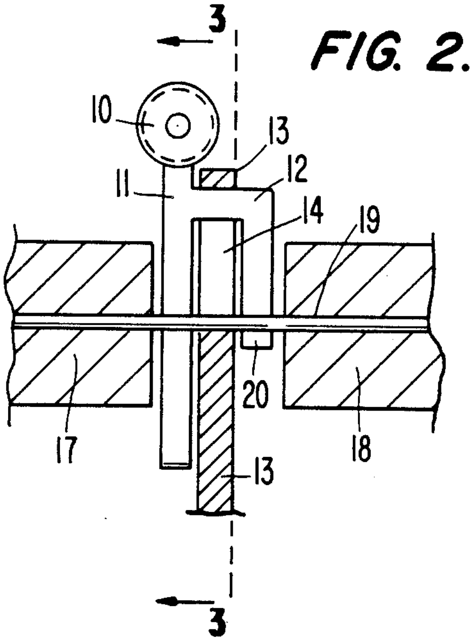
Figure 3:
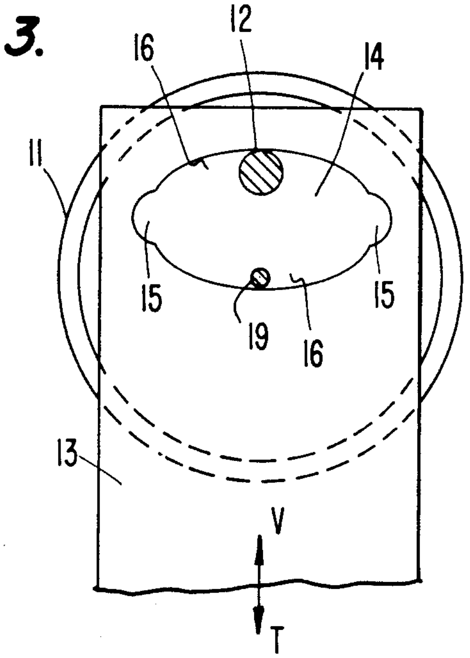
FIG. 3 is a cross-section along the line III—III in FIG. 2.

FIGS. 2 and 3 show a few of the essential parts of the tilting elements for the device according to the invention. This is not a complete design drawing, but merely the representation of a few parts for explaining the method of operation of the tilting elements according to the invention.

The motor, not shown in FIG. 2, is fitted with an output shaft carrying a worm 10. Worm 10 meshes with worm gear teeth arranged around the outer periphery of crank-disc 11. Crank-disc 11 is secured to a shaft 19 mounted in bearings 17 and 18.

Provided externally of the centre of crank-disc 11 is crank pin 12 which projects axially outwardly and carries a radially directed holding part 20 at its free end. Holding part 20 is also secured to shaft 19. Arranged in the space between crank-disk 11 and holding part 20 is a connecting rod 13 which, as indicated in FIG. 3 by a double arrow, can carry out reciprocating motions. The relevant guides and mountings are not shown, nor is the connection between the connecting rod 13 and the mirror. Attention is only drawn to the fact that the reciprocating motion of connecting rod 13 allows the mirror to pivot between its two positions V and T, the normal position, or fully-reflecting position, and the non-dazzle position, or partly-reflecting position.

Connecting rod 13 is designed with a substantially elliptical opening 14 in which crank-pin 12 can move in rotation. Opening 14 is designed with areas 15 of greater radial extension and areas 16 of lesser radial extension. In areas 15, a sectorial bulge may also be provided with a radius which is somewhat larger than the diameter of crank-pin 12.

In the positions shown in FIGS. 2 and 3, crank-pin 12 is located in upper area 16, corresponding to position V of the mirror.

The figures do not show rotary switch DS which is secured to crank-disc 11 in such a manner that it carries out its switching functions when the crank-pin is located in areas 15 of greater radial extension.

Rotation of the motor causes worm 10 and crank-disc 11 to rotate. This initially produces a relatively small amount of movement of connecting rod 13. When crank-pin 12 enters area 15, the switch performs its switching function and switches off the current to motor M. The motor continues to move, allowing crank-pin 12 to reach area 16 of connecting rod 13. With view to FIG. 3 connecting rod 13 is shifted to its lower position in which the mirror assumes the partly-reflecting position.

It is obvious that small movements of crank-pin 12, regardless of what causes them, can scarcely produce reciprocating movements of connecting rod 13. The position of the mirror therefore remains unchanged, even if vibrations are transferred to the mechanism. As a result of this, the mirror remains relatively stable in its two terminal positions.

The terminal positions of the mirror may also be adjusted individually by mechanical or electronic means.

It may be gathered from FIG. 2 that crank-disk 11 is supported and directly restricted in axial direction by bearings 17 and 18 and shaft 19. Fitting the bearings to crank-disc 11 ensures that crank-disc 11 and also crank-pin 12 cannot carry out tilting movements. In the known tilting mechanisms, the part corresponding to crank-disc 11 is mounted at one end only, which leads to the fact that the tilting mechanism is relatively wobbly and that these interfering motions may be transferred to the mirror also.

Both interior and exterior mirrors may be adjusted automatically with the device according to the invention.

I claim:

1. In a device for pivoting a motor-vehicle mirror between a normal fully reflecting position to a non-dazzle partly reflecting position in response to the presence of glare from the headlight of a following vehicle and ambient light conditions, said device comprising a voltage source, a motor having a shaft acting upon said mirror through a tilting mechanism, and first and second thyristers controlling energization of said motor, and circuit means for energizing and de-energizing said thryisters in accordance with the presence of glare and interference from ambient light, the improvement wherein said circuit means includes a bipolar rotary switch connected in series with said motor, said switch interrupting the flow of current through said motor at specific angles of rotation of the shaft of said motor, disconnecting the previously conducting thyrister from the voltage source and switching it off and wherein the tilting mechanism comprises a crank-disk driven by said motor with a crank pin and a connecting rod which is moved back and forth by means of said crank pin, said connecting rod being connected to said mirror and having a substantially elliptical opening surrounding said crank pin, said elliptical opening defining areas of greater and lesser radial extension, the areas of said opening of lesser radial extension being associated with the normal and non-dazzle positions of said mirror and the areas of greater radial extension of said opening being associated with said specific angles of rotation of the shaft of said motor.

2. In a device as recited in claim 1, further characterized in said circuit means including delay means to delay the energization of one of said thyristers in response to the presence of glare, said delay means comprising a transistor and capacitor circuit connected between the gate and cathode of said thyrister.

3. In a device as recited in claim 1, further characterized in that light emitting diodes are connected in parallel with said thyristers.

4. In a device as recited in claim 1, characterized in that said circuit means includes photoresponsive means positioned to respond to the presence of ambient light and connected to prevent ignition of one of said thyristers by said circuit means in response to the presence of glare when ambient light is present.

5. In a device as recited in claim 4, wherein said photoresponsive means is connected in circuit with said voltage source through said rotary switch when said rotary switch is in position corresponding to the normal position of said mirror.

6. In a device as recited in claim 1, wherein said crank-disk is mounted for rotation in bearings.

* * * * *